US007251956B2

(12) United States Patent
Sawchuk et al.

(10) Patent No.: US 7,251,956 B2
(45) Date of Patent: *Aug. 7, 2007

(54) MODULAR LNG PROCESS

(75) Inventors: Jeffrey H. Sawchuk, Katy, TX (US); Richard Jones, Jr., Katy, TX (US); Patrick B. Ward, Katy, TX (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/325,933

(22) Filed: Jan. 5, 2006

(65) Prior Publication Data

US 2006/0112726 A1    Jun. 1, 2006

Related U.S. Application Data

(63) Continuation of application No. 10/676,930, filed on Sep. 30, 2003, now Pat. No. 7,047,764.

(60) Provisional application No. 60/414,806, filed on Sep. 30, 2002.

(51) Int. Cl.
    *F25J 1/00*    (2006.01)
(52) U.S. Cl. .......................................... 62/612; 62/911
(58) Field of Classification Search ................ 62/611, 62/612, 613, 911
    See application file for complete search history.

(56) References Cited

U.S. PATENT DOCUMENTS 3,161,492 A    12/1964    Farkas et al.

(Continued)

FOREIGN PATENT DOCUMENTS

WO    0181845    11/2001

(Continued)

OTHER PUBLICATIONS

C. Th. Sanders, "De technologie van vloeibaar aardgas ontwikkeling en toekomst" Koude Klim. vol. 82, No. 8 (Aug. 1989) pp. 33-37, No translation.

(Continued)

*Primary Examiner*—William C. Doerrler
(74) *Attorney, Agent, or Firm*—John L. Wood

(57) ABSTRACT

Disclosed are methods for efficiently and economically designing, constructing, or operating a light hydrocarbon gas liquefaction process for the liquefaction of selected quantities of light hydrocarbon gas. The method includes a light hydrocarbon gas liquefaction launch train to liquefy an initial amount of light hydrocarbon gas and one or more optional subsequent modular expansion phases to said light hydrocarbon gas liquefaction train to liquefy additional selected quantities of light hydrocarbon gas up to a selected maximum quantity of light hydrocarbon gas for the process. The methods employ shared use facilities, such as light hydrocarbon feed gas pretreatment facilities, refrigerant compression facilities, cryogenic heat exchange facilities, access services, other liquefaction equipment, and liquefied product storage and shipping facilities. The use of such shared use facilities allows for subsequent expansion phases or modules to be constructed to increase overall plant capacity, which can reduce the capital costs and space needed relative to prior methods for the design, construction, or operation of a light hydrocarbon liquefaction process which call for construction of a complete liquefaction train and all of its associated components and related equipment.

27 Claims, 4 Drawing Sheets

U.S. PATENT DOCUMENTS

| | | | |
|---|---|---|---|
| 5,896,755 | A | 4/1999 | Wong et al. |
| 6,168,768 | B1 * | 1/2001 | Alexion et al. ............. 423/210 |
| 6,176,046 | B1 | 1/2001 | Quine et al. |
| 6,220,052 | B1 | 4/2001 | Tate et al. |
| 6,389,844 | B1 | 5/2002 | Klein Nagel Voort |
| 6,647,744 | B2 | 11/2003 | Fanning et al. |
| 7,047,764 | B2 * | 5/2006 | Sawchuk et al. ............. 62/611 |
| 2003/0154739 | A1 | 8/2003 | Fanning et al. |
| 2004/0109803 | A1 | 6/2004 | Sawchuk et al. |

FOREIGN PATENT DOCUMENTS

| | | |
|---|---|---|
| WO | 03064946 | 8/2003 |
| WO | 03064947 | 8/2003 |

OTHER PUBLICATIONS

Collins et al., "Liquefaction Plant Design in the 1990s", Hydrocarbon Processing, Gulf Publishing Co., Houston, TX, vol. 74, No. 4, (Apr. 1995), pp. 67-76.

Kosseim et al, "New Developments in Gas Purification for LNG Plants", IGT Int'l Inst. of Refrig. 10th LNG Conf. (May 1992).

James H.R., "Modular and Barge-Mounted Process Plants", AICHE Nat'l Meeting (Mar. 1982).

* cited by examiner

MODULAR LNG PROCESS

RELATED APPLICATIONS

This is a continuation of application Ser. No. 10/676,930, filed Sep. 30, 2003 now U.S. Pat. No. 7,047,764.

This application is entitled to and hereby claims the benefit of provisional application Ser. No. 60/414,806 filed Sep. 30, 2002, the teachings of which are incorporated herein by reference in their entirety.

FIELD OF THE INVENTION

This invention relates to a method for liquefying variable selected quantities of light hydrocarbon gas to produce liquefied light hydrocarbon gas using plant facilities that comprise an initial light hydrocarbon gas liquefaction launch train with common shared facilities, which may be expanded by adding plant equipment associated with one or more optional expansion phases to the launch train.

BACKGROUND OF THE INVENTION

Many light hydrocarbon gas reserves are found in areas of the world that are remote to any markets for the light hydrocarbon gas. Such light hydrocarbon gas is referred to as natural gas. This natural gas may contain condensates that are light gasoline boiling range materials as well as $C_3$-$C_5$ gaseous hydrocarbons and methane.

Frequently such natural gas also contains undesirably high quantities of water, acid gas compounds such as sulfur compounds, carbon dioxide and the like for liquefaction to produce liquefied light hydrocarbon gases, which typically comprise primarily methane and which are frequently referred to as liquefied natural gas (LNG).

When such gases are liquefied, the capacity of the liquefaction plant is determined primarily by the available market for the gas, the availability of transportation to the market and the like. Accordingly in many instances it is desirable to increase the capacity of the liquefaction process in incremental stages as the market expands to remain in balance with the available market. Accordingly light hydrocarbon gas liquefaction processes, referred to herein as natural gas liquefaction processes or LNG processes, are typically installed in trains. The term "train" as used herein refers to a series of vessels capable of, pre-treating and liquefying natural gas. The gas is desirably treated to remove acid gases and water to very low levels prior to charging it to the liquefaction zone. The train also includes compression facilities for compressing the refrigerant required for the refrigeration vessel and the like. The train is an integrated process for producing a selected quantity of liquefied natural gas. Previously, industry has expanded plant capacity by adding one or more additional trains (each of which includes its own gas pretreatment equipment, liquefaction equipment, as well as liquefied product transport and storage facilities), as required to meet the available market demand and the like. Such trains have been previously designed to produce a certain quantity of liquefied product with no future expansion of the train having been considered in the design.

In FIG. 1, an embodiment of a light hydrocarbon gas liquefaction system and process (train) is schematically shown. The system and process, as shown, includes a refrigeration cryogenic heat exchanger 15. As shown, compressed refrigerant is supplied to cryogenic heat exchanger 15 by turbines 31, 33, 35, and 37, which are shaft coupled to refrigerant compressors 32, 34, 36, and 38, respectfully. High-pressure refrigerant is supplied to compressors 32 and 34 by high-pressure refrigerant lines 61 and 62. These lines typically return high-pressure refrigerant from cryogenic heat exchanger 15 after it has served its purpose as a refrigerant and has been warmed to a substantially gaseous condition. Compressed high-pressure refrigerant is supplied to cryogenic heat exchanger 15 via lines 63 and 64. Low-pressure refrigerant is supplied to compressors 36 and 38 by low-pressure refrigerant lines 65 and 66. These lines typically return low-pressure refrigerant from cryogenic heat exchanger 15 after it has served its purpose as a refrigerant and has been warmed to substantially gaseous condition. Compressed low-pressure refrigerant is supplied to cryogenic heat exchanger 15 via lines 67 and 68. No significance should be attributed to this except that refrigerants can be produced from compressors 32, 34, 36, and 38 at different pressures if desired and passed to cryogenic heat exchanger 15 at different points in the refrigeration process if desired. The same or different refrigerants can be used in the high-pressure and low-pressure refrigerant loops, as known to those skilled in the art.

Further, an inlet light hydrocarbon gas that has desirably been treated to remove acid gases and water is charged to cryogenic heat exchanger 15 via line 59. The liquefied light hydrocarbon gas product is produced through line 69. Typically, a natural gas or other light hydrocarbon gas stream is introduced to acid gas removal vessel 10 via line 40. Acid gas regenerator 11 is shown in fluid communication with acid gas removal vessel 10 via lines 41 and 42. The treated gas is typically recovered from vessel 10 through line 43. The recovered gases are passed via lines 44, 45, and 46 to designated dehydration vessels 20, 21, and 22. Typically vessel 10 is an aqueous amine scrubber, operating as known to those skilled in the art. The aqueous amine may be selected from materials such as digycolanolamine (DGA), diethylamine (DEA), methyldiethanolamine (MDEA), methylethylanolamine (MEA), SULFINOL (trademark of Shell Oil Company), activated methyldiethanolamine (aMDEA), and combinations thereof. Carbon dioxide is typically removed to levels less than about 60 parts per million (ppm) while sulfur is typically removed to levels less than about 4 ppm through vessels such as acid gas removal vessel 10.

The general operation of such acid gas removal vessels, as shown, is well known to those skilled in the art. Since each train has been typically constructed separately as market demands require, it is common to provide an acid gas removal vessel and an associated acid gas regenerator for each train. This has also been the case for other components of such trains and associated infrastructure.

Since the aqueous amine process produces a gas that is relatively saturated in water and since the water freezes at a temperature much higher than methane, which constitutes the majority of the natural gas stream to be liquefied, it is necessary that at least a major portion of the water be removed from the gas stream. Treated water-saturated gas is recovered from acid gas removal vessel 10 via line 43 where it is passed to dehydration vessels 20, 21, and 22 via lines 44, 45, and 46, respectfully. Water is selectively removed through dehydration vessels 20, 21, and 22 to produce a dewatered gas in lines 54, 55, and 56. The dehydrated gas from vessels 20, 21, and 22 is then combined and passed to cryogenic heat exchanger 15 via line 59. Typically, these dehydration vessels contain an adsorption material such as a molecular sieve, activated alumina, or the like. Such material is effective in removing the water from an inlet gaseous stream to extremely low levels, thus rendering the gaseous stream suitable for liquefaction in cryogenic heat exchanger 15. Typically three vessels are placed in each train to meet the requirements to dehydrate incoming gas. The process may also use adsorption materials for removal of other contaminants, such as mercury.

In the use of dehydration vessels 20, 21, and 22, two vessels will generally serve to remove the water from its associated feed gas stream, 44, 45, or 46, while one vessel is being regenerated by hot regeneration gas. Such configuration is depicted in FIG. 1 where dehydration vessels 20 and 21 serve to produce relatively water free gas streams 54 and 55 by removing water from inlet gas streams 44 and 45. Dehydration vessel 22, in the depicted configuration, is being regenerated by hot regeneration gas where the regeneration gas enters the vessel via line 70 and exits via line 71. All dehydration vessels 20, 21, and 22 all have the capability to operate in either dehydration or regeneration mode (though not shown for simplicity), as indicated in FIG. 1 by vessel 22 and process streams 70 and 71. Typically three vessels are placed in each train to meet the requirements of dehydration the incoming gas.

The acid gas removal vessels are readily regenerated as well known to those skilled in the art by a variety of techniques. One commonly used technique is the use of a reboiler on vessel 11 for regeneration.

A wide variety of refrigeration processes are contemplated within the scope of the present invention. No novelty is claimed with respect to the particular type of refrigeration process or vessel used. The process of the present invention is considered to be useful with any type of liquefaction process that requires light hydrocarbon gas as an inlet stream.

Clearly, the construction of separate trains of refrigeration processes as discussed above results in the expenditure of considerable capital to duplicate common facilities in each train, such as the dehydration vessels, acid gas removal vessels, and refrigerant compression and cryogenic liquefaction equipment. Accordingly, a continuing search has been directed to the development of systems and methods for reducing the unnecessary expense for these duplicate vessels.

SUMMARY OF THE INVENTION

According to the present invention, it has now been found that the expense required for these vessels can be reduced by a method for designing an efficient and economical light hydrocarbon gas liquefaction process for the liquefaction of selected quantities of light hydrocarbon gas in an initial launch light hydrocarbon gas liquefaction train and one or more optional subsequent expansion phases to said light hydrocarbon liquefaction train to liquefy additional selected quantities of light hydrocarbon gas up to a selected maximum quantity of light hydrocarbon gas for the process. The method comprises:

a) designing the light hydrocarbon gas liquefaction launch train for the liquefaction of the selected initial quantity of light hydrocarbon gas, the launch train including facilities for light hydrocarbon gas pretreatment to remove acid gases and water, refrigerant compression, cryogenic heat exchange, access services, light hydrocarbon gas liquefaction, and liquefied light hydrocarbon gas product storage and shipping;

b) designing at least a portion of the facilities in the launch train for shared use by the launch train and any subsequent optional modular expansion phases to said launch train; and c) designing at least a portion of the launch train facilities for shared use by modular expansion, as required by the addition of one or more subsequent optional expansion phases to the launch train, up to the maximum capacity as required to liquefy the selected maximum quantity of light hydrocarbon gas for the process, the shared use facilities of the launch train being designed at a size sufficient to liquefy the selected maximum quantity of light hydrocarbon gas for the process either in the launch train as constructed or as constructed in the launch train and expanded in the one or more optional expansion phases to the required capacity.

It has further been found that an improvement is achieved by a method for efficiently and economically constructing a light hydrocarbon gas liquefaction process for the liquefaction of selected quantities of light hydrocarbon gas in an initial light hydrocarbon gas liquefaction launch train and one or more optional subsequent expansion phases to said light hydrocarbon liquefaction train to liquefy additional selected quantities of light hydrocarbon gas up to a selected maximum quantity of light hydrocarbon gas for the process. The method comprises:

a) constructing a light hydrocarbon gas liquefaction launch train for the liquefaction of a first selected quantity of light hydrocarbon gas including facilities for light hydrocarbon gas pretreatment to remove acid gases and water, refrigerant compression, cryogenic heat exchange, access services, light hydrocarbon gas liquefaction, and liquefied light hydrocarbon gas product storage and shipping;

b) positioning at least a portion of the facilities in the launch train for shared use by the launch train and optional subsequent expansion phases;

c) constructing at least a portion of the launch train facilities for shared use for modular expansion as required by the addition of subsequent expansion phases up to the maximum capacity required to liquefy the maximum quantity of light hydrocarbon gas or initially constructing the portion of the launch train facilities for shared use of a size sufficient to liquefy the maximum quantity of liquefied light hydrocarbon gas for the process either in the launch train as constructed or as constructed in the launch train and expanded in the one or more optional expansion phases to the required capacity.

It has also been found that an improvement is achieved by a method for efficiently and economically operating a light hydrocarbon gas liquefaction process for the liquefaction of selected quantities of light hydrocarbon gas. The process includes a light hydrocarbon gas liquefaction launch train to liquefy an initial amount of light hydrocarbon gas and one or more optional subsequent expansion phases to said light hydrocarbon gas liquefaction train to liquefy additional selected quantities of light hydrocarbon gas up to a selected maximum quantity of light hydrocarbon gas for the process. The method comprises:

a) constructing the light hydrocarbon gas liquefaction launch train for the liquefaction of the selected initial quantity of light hydrocarbon gas, the launch train including facilities for light hydrocarbon gas pretreatment to remove acid gases and water, refrigerant compression, cryogenic heat exchange, access services, light hydrocarbon gas liquefaction, and liquefied light hydrocarbon gas product storage and shipping;

b) positioning at least a portion of the facilities in the launch train for shared use by the launch train and any subsequent optional modular expansion phases to said launch train;

c) constructing at least a portion of the launch train facilities for shared use by modular expansion, as required by the addition of one or more subsequent optional expansion phases to the launch train, up to the maximum capacity as required to liquefy the selected maximum quantity of light hydrocarbon gas for the process, the shared use facilities of the launch train being designed at a size sufficient to liquefy the selected maximum quantity of light hydrocarbon gas for the process either in the launch train as constructed or as constructed in the launch train and expanded in the one or more optional expansion phases to the required capacity; and d) processing light hydrocarbon gas in the launch train to produce liquefied light hydrocarbon gas.

In embodiments, the invention also relates to a method for efficiently and economically operating a light hydrocarbon gas liquefaction process for the liquefaction of selected quantities of light hydrocarbon gas. The process includes a light hydrocarbon gas liquefaction launch train to liquefy an initial amount of light hydrocarbon gas and one or more subsequent expansion phases to said light hydrocarbon gas liquefaction train to liquefy additional selected quantities of light hydrocarbon gas up to a selected maximum quantity of light hydrocarbon gas for the process. The method comprises:

a) constructing the light hydrocarbon gas liquefaction launch train for the liquefaction of the selected initial quantity of light hydrocarbon gas, the launch train including facilities for light hydrocarbon gas pretreatment to remove acid gases and water, refrigerant compression, cryogenic heat exchange, access services, light hydrocarbon gas liquefaction, and liquefied light hydrocarbon gas product storage and shipping;

b) positioning at least a portion of the facilities in the launch train for shared use by the launch train and subsequent modular expansion phases to said launch train;

c) constructing at least a portion of the launch train facilities for shared use by modular expansion, as required by the addition of one or more subsequent expansion phases to the launch train, up to the maximum capacity as required to liquefy the selected maximum quantity of light hydrocarbon gas for the process, the shared use facilities of the launch train being designed at a size sufficient to liquefy the selected maximum quantity of light hydrocarbon gas for the process either in the launch train as constructed or as constructed in the launch train and expanded in the one or more expansion phases to the required capacity;

d) processing light hydrocarbon gas in the launch train to produce liquefied light hydrocarbon gas;

e) constructing one or more expansion phases to the launch train to increase the capacity of the launch train as required to liquefy additional selected quantities of light hydrocarbon gas up to the selected maximum quantity of light hydrocarbon gas for the process, said expansion phases capable of producing liquefied light hydrocarbon gas by use of the shared use facilities in the launch train as constructed in the launch train or as constructed in the launch train and expanded in the one or more expansion phases to the required capacity; and f) processing light hydrocarbon gas into liquefied light hydrocarbon gas using the launch train and the one or more expansion phases employing the shared use facilities.

DESCRIPTION OF PREFERRED EMBODIMENTS

In the description of the Figures, numerous pumps, valves and the like, necessary to achieve the flows shown, as known to those skilled in the art, have not been shown for simplicity.

Figure 1:
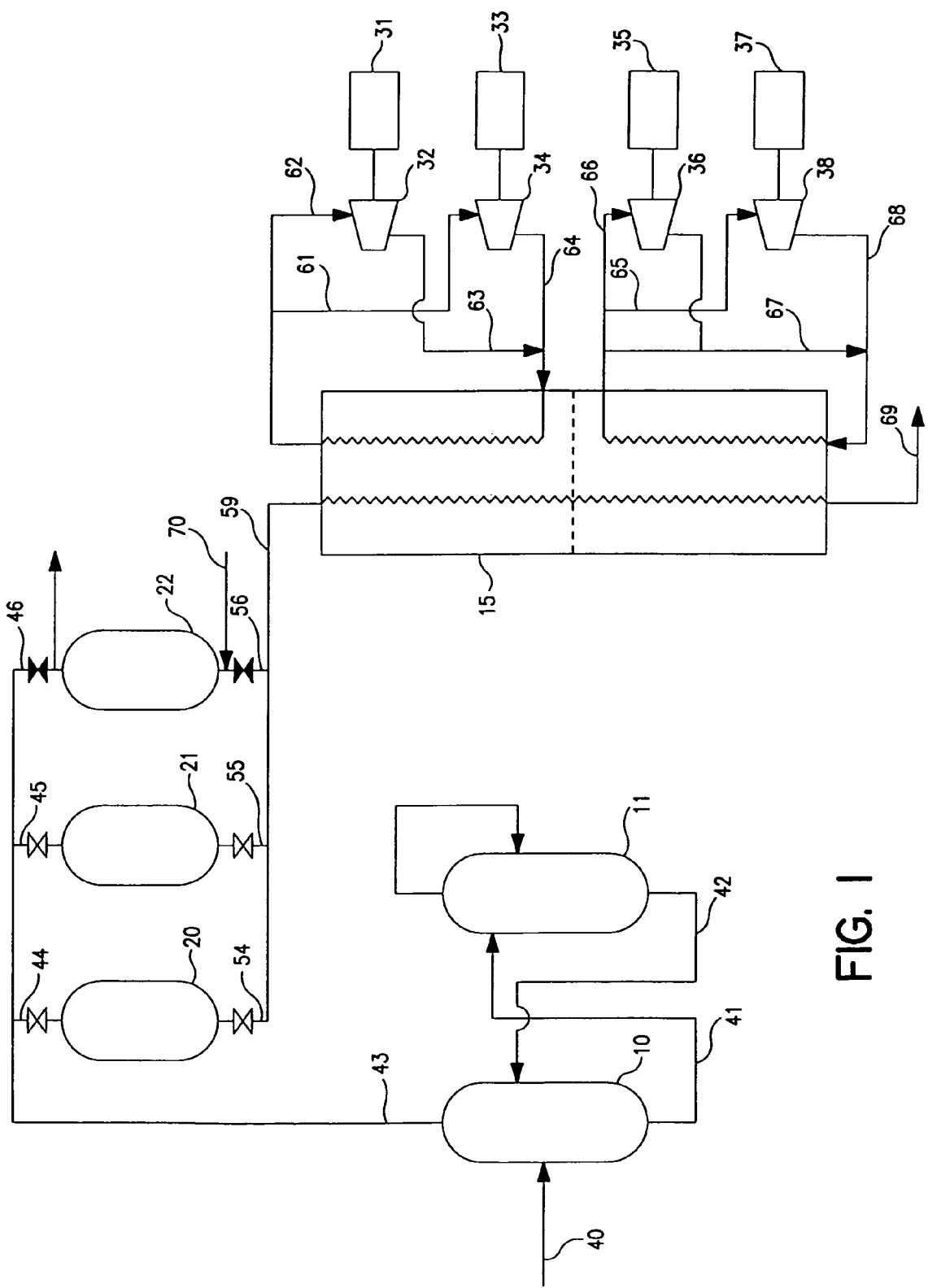
FIG. 1 is a schematic diagram of a process for liquefying light hydrocarbon gas using one liquefaction train.

The present invention provides an improved efficiency and economy in operating a light hydrocarbon gas liquefaction process for the liquefaction of selected quantities of light hydrocarbon gas by use of an initial light hydrocarbon gas liquefaction launch train, and up to a selected maximum quantity of liquefied light hydrocarbon gas using one or more subsequent modular expansion phases by a method comprising the design of such process to include certain facilities which are common to both the initial launch train and subsequent expansion phases. As indicated the term "light hydrocarbon gas liquefaction train" or "train" refers to those units and facilities used for pretreatment and post-treatment of the gas feeds to the liquefaction facility as well as the facilities for compressing the refrigerant and the like as shown in FIG. 1. Such acid gas facilities can include acid gas removal equipment, dehydration equipment, mercury or other contaminant removal equipment, and refrigerant compression and cryogenic heat exchange equipment, and associated piping.

Vessels for the removal of acid gases and for dehydration typically include both an absorption vessel and a regenerator vessel to regenerate the media used in the vessel for acid gas removal or for dehydration respectively. For example in the acid gas removal section an absorption vessel and a regeneration vessel are required. If these facilities are duplicated in each train (as previously practiced within the art) then each train will include an absorption vessel and a regenerator vessel. Clearly an economy could be realized if upon design and construction of the initial launch train, the train was designed and constructed to include a regenerator for the aqueous amine used in the acid gas absorption vessels of a size sufficient to accommodate additional absorption vessels as required as additional expansions are desired. Desirably this equipment is located in an area which is equally accessible or at least accessible to all necessary equipment so that additional acid gas removal vessels can be positioned to serve the launch train and additional expansions and remain in fluid communication with the regenerator vessel for the regeneration and recycling of the aqueous amine solution used for the acid gas absorption. For instance, these vessels could be commonly sited with the gas from which the acid gases have been removed being then passed to the appropriate liquefaction facility. This results in the construction of only a single aqueous amine regeneration vessel and permits the construction of only an additional acid gas absorption vessel for each subsequent liquefaction expansion phase.

Similarly when dehydration vessels are used three are typically constructed for each train. Two vessels are typically used for adsorption of water with the third being regenerated by hot gases which drive out the water. When the estimated maximum quantity of gas to be produced is known, then a plurality of dehydration vessels can be placed together at a common site to dewater the reduced acid gas content gas produced by the removal of the acid gases to produce a dewatered light liquid hydrocarbon gas stream having a reduced acid gas content. It is well known that the regeneration times for such vessels is substantially less than the time required on line for dehydration. Prior practice has been to provide three dehydration vessels for each train so that two vessels are on line while the other vessel is being regenerated. If the vessels are located at a common site only one extra vessel needs to be added during an expansion. The single vessel is sufficient since the two vessels which are operative at any given time will operate for long enough to provide time to regenerate the third vessel. When the third vessel is regenerated the gas flow from one of the other vessels which may have become spent can be rerouted to the regenerated vessel with the vessel which has become spent then being regenerated. By the use of the vessels in this fashion a plurality of vessels can be used without the need to produce a second vessel for regeneration for each dehydration vessel. These vessels can be used in groups wherein the number of vessels usable in a group is equal to a number equal to the run time for each vessel divided by the regeneration time to produce a number which is a whole number disregarding any fraction plus one. This number defines the number of vessels which can be used with one additional vessel for regeneration. In the event that the regeneration time is equal to one third of the run time then four vessels can be used to service three trains rather than the six vessels which would normally be constructed according to the prior art. Similarly improvements can be realized in the construction of docking facilities, liquid natural gas storage and shipping facilities, $C_3$+ hydrocarbon removal facilities and the like.

According to the present invention these facilities are produced in a form in the first launch train from which they can be expanded by modular increments or of a size necessary to handle the maximum quantity of light hydrocarbon gas which will be processed through the liquefaction process.

Typically, such processes have been expanded by adding trains and as indicated previously by duplicating all the facilities required for each train in each train. According to the present invention shared facilities are used by the first liquefaction launch train and the subsequent modular expansion phases. The initial launch liquefaction train is designed to size the shared equipment of a size capable of handling the maximum capacity expected by the combination of the initial launch train and incremental expansion as modular expansion phases are added to increase capacity. For instance, less than a full amount of compressed refrigerant may be charged in a subsequent modular expansion initially. This permits addition of the expansion phase before a market exists for all of the liquefied natural gas which could be produced through the facility. It also permits ready expansion of this system when the market expands to include a full compressed refrigerant charge to another subsequent modular expansion phase.

Figure 2:
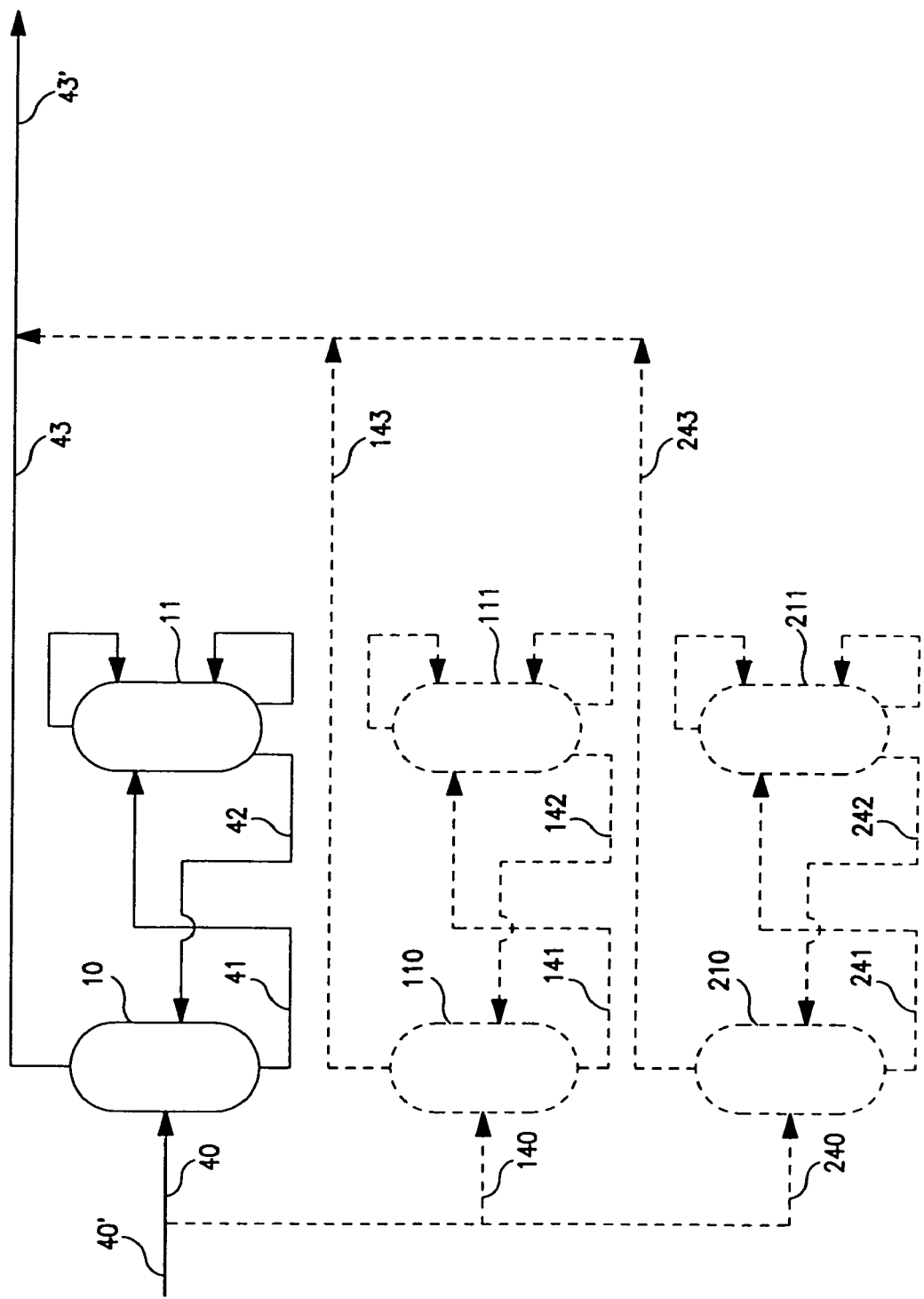
FIG. 2 is a schematic diagram of an embodiment of the invention using an acid gas removal facility as a shared use facility where a launch train comprises equipment and associated piping depicted with solid lines and subsequent expansion phases (modules) to the launch train comprise equipment and associated piping depicted by the dashed lines.

FIG. 2 illustrates a phased expansion of an acid gas removal unit (AGRU) where the solid lines represent a launch (new or existing) train and the dotted lines represent optional future expansion equipment and associated piping required for a one or two-phase expansion. As depicted previously in FIG. 1, each train typically contains an acid gas removal vessel 10 and an acid gas regenerator 11. According to the present invention, it is desirable that the facilities required for acid gas removal for the initial launch train and subsequent expansions be arranged in a common area, or at least in reasonable fluid communication in efforts to reduce capital expenditure and improve the overall plant layout. For example, if it is desired to increase the plant throughput, acid gas removal vessel 110 and acid gas regenerator 111 along with associated piping could be installed, thus increasing the throughput of the original AGRU. A further train expansion could be obtained through the addition of acid gas removal vessel 210 and acid gas regenerator 211 along with associated piping. Depending on plant operating conditions and parameters, the need for multiple acid gas regenerators could be eliminated by using one acid gas regenerator, which would further reduce the capital expenditure and space (real estate) required by full train expansions previously known in the art. Though not shown in FIG. 2, and depending on the amount of acid gas in the light hydrocarbon feed gas, optionally the acid gas regenerator 11 can be sized so that it can handle all of the regeneration requirements for future expansions, thereby eliminating the need for acid gas regenerators 111 and 211.

After the implementation of the two expansions shown in FIG. 2, three acid gas removal vessels 10, 110, and 210 are available for use to remove acid gases from inlet gas streams, which are charged via line 40' (forty prime). The inlet gas may be passed via lines 40, 140, and 240 to any or all of the acid gas removal vessels 10, 110, and 210. The acid gas removal vessels shown may employ aqueous amine solutions, as known generally in the art, and operate as discussed in connection with FIG. 1. The gaseous streams having reduced acid gas content are recovered through lines 43, 143, and 243 where they combine to create stream 43' (forty-three prime), which then continues through the remainder of the process.

It is desired that a plurality of train expansions be serviced by the acid gas removal facility shown in FIG. 2. As shown, the facility could attend to the acid gas removal needs for the launch train and additional expansions with regeneration occurring in the three regeneration vessels 11, 111, and 211, or one appropriately sized regeneration vessel as previously mentioned. The fresh amine is produced via lines 42, 142, and 242 and passed into the upper portion of vessels 10, 110, and 210, respectfully. The spent amine is passed via lines 41; 141, and 241 to vessels 11, 111, and 211 to complete the loop. If it is desired to design and operate only one acid gas regeneration vessel, the fresh amine from the acid gas regeneration vessel, carried by one primary line (not shown for simplicity) exiting the lower portion of the regeneration vessel, would be appropriately distributed through lines 42, 142, and 242. Similarly, the spent amine would leave acid gas removal vessels 10, 110, and 210 via lines 41, 141, and 241 and combine into one primary line (also not shown) entering the upper portion of the single acid gas regeneration vessel. In either embodiment, a regenerated aqueous amine solution is provided to the upper portion of each vessel on a continuous basis with spent amine solution being recovered from the lower portion of the vessel and passed back to regeneration.

Should one regeneration vessel be used, the vessel must be sized to provide sufficient fresh regenerated aqueous amine to remove the acid gas compounds from the gaseous stream charged to the operating acid gas removal vessels, 10, 110, and 210. The sizing of one regeneration vessel entails little additional expense to provide sufficient regenerating capacity to provide sufficient regenerated amine to service all four of the vessels. Thus, additional expansions can be made by simply adding a single acid gas removal contact vessel. So long as significant regeneration capacity exists, the gain in gas throughput is obtained at a considerably reduced capital cost by virtue of requiring only the addition of a single acid gas removal vessel rather than an acid gas removal vessel and a regeneration vessel.

Figure 3:
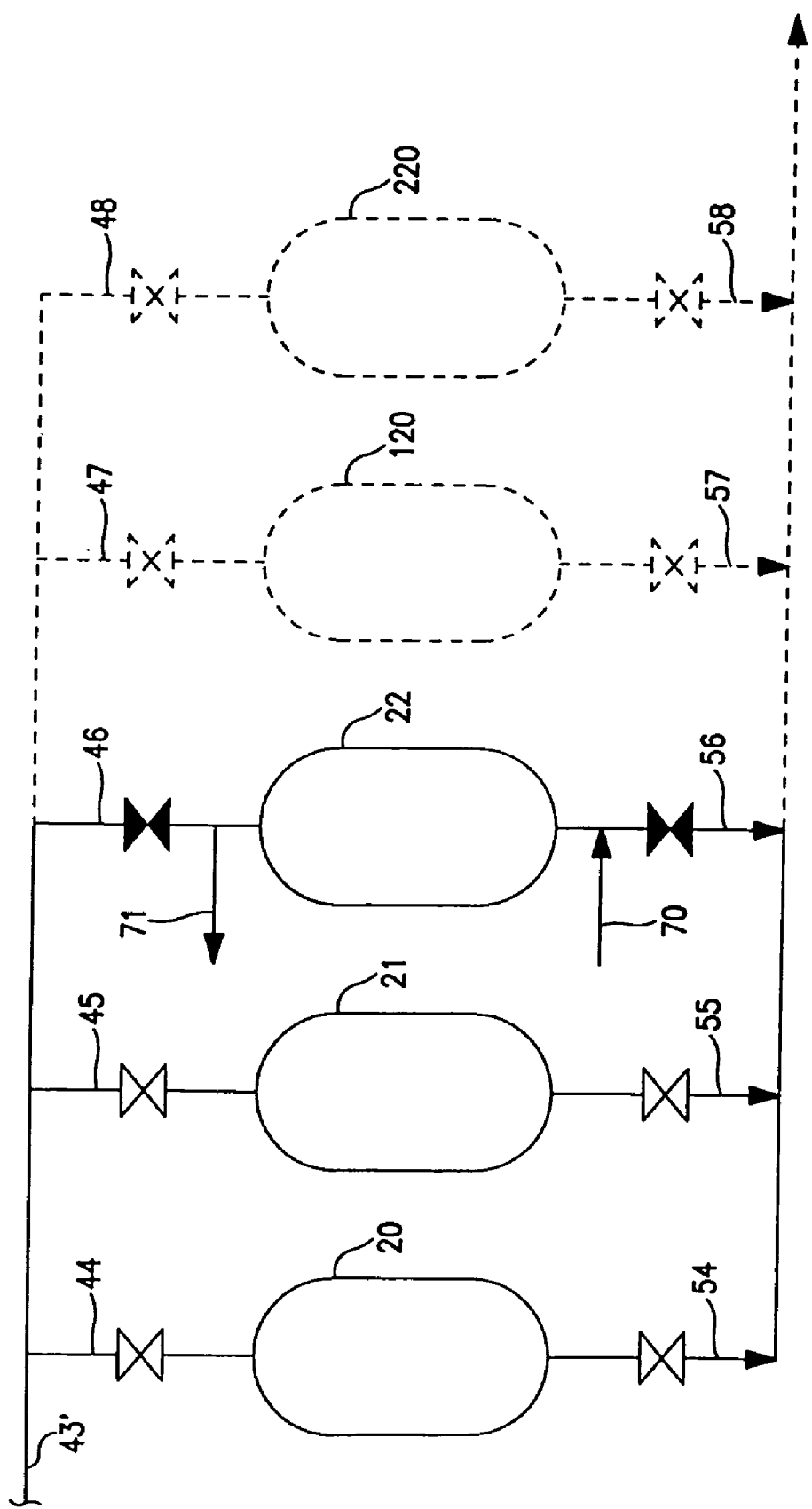
FIG. 3 is a schematic diagram of an embodiment of the invention using a dehydration facility as a shared use facility where a launch train comprises equipment and associated piping depicted with solid lines and subsequent expansion phases (modules) to the launch train comprise equipment and associated piping depicted by the dashed lines.

In a preferred embodiment shown in FIG. 3, an arrangement of vessels suitable for use in dehydrating a light hydrocarbon gas stream has been shown, where solid lines represent a launch (new or existing) train and the dotted lines represent possible expansion equipment and associated piping required for a one or two phase expansion. An inlet gas stream is received through line 43' (forty-three prime) and may be passed to dehydration vessels 20, 21, 22, 120, and 220 that are not in regeneration mode via lines 44, 45, 46, 47, and 48 respectfully. The product streams, virtually free of water, are recovered through process lines 54, 55, 56, 57, and 58 respectfully. Each vessel can be designed for operation in either dehydration or regeneration mode, which has not been fully shown for simplicity. For example, as shown in FIG. 3 by the solid lines, vessels 20 and 21 are in dehydration mode while vessel 22 is in regeneration mode where a stripping gas is introduced to vessel 22 via line 70 and exits via line 71. Although not depicted in FIG. 3, each vessel is designed with appropriate valves and piping so that all dehydration vessels may operate in either dehydration or regeneration mode, as illustrated through the previous example.

Figure 4:
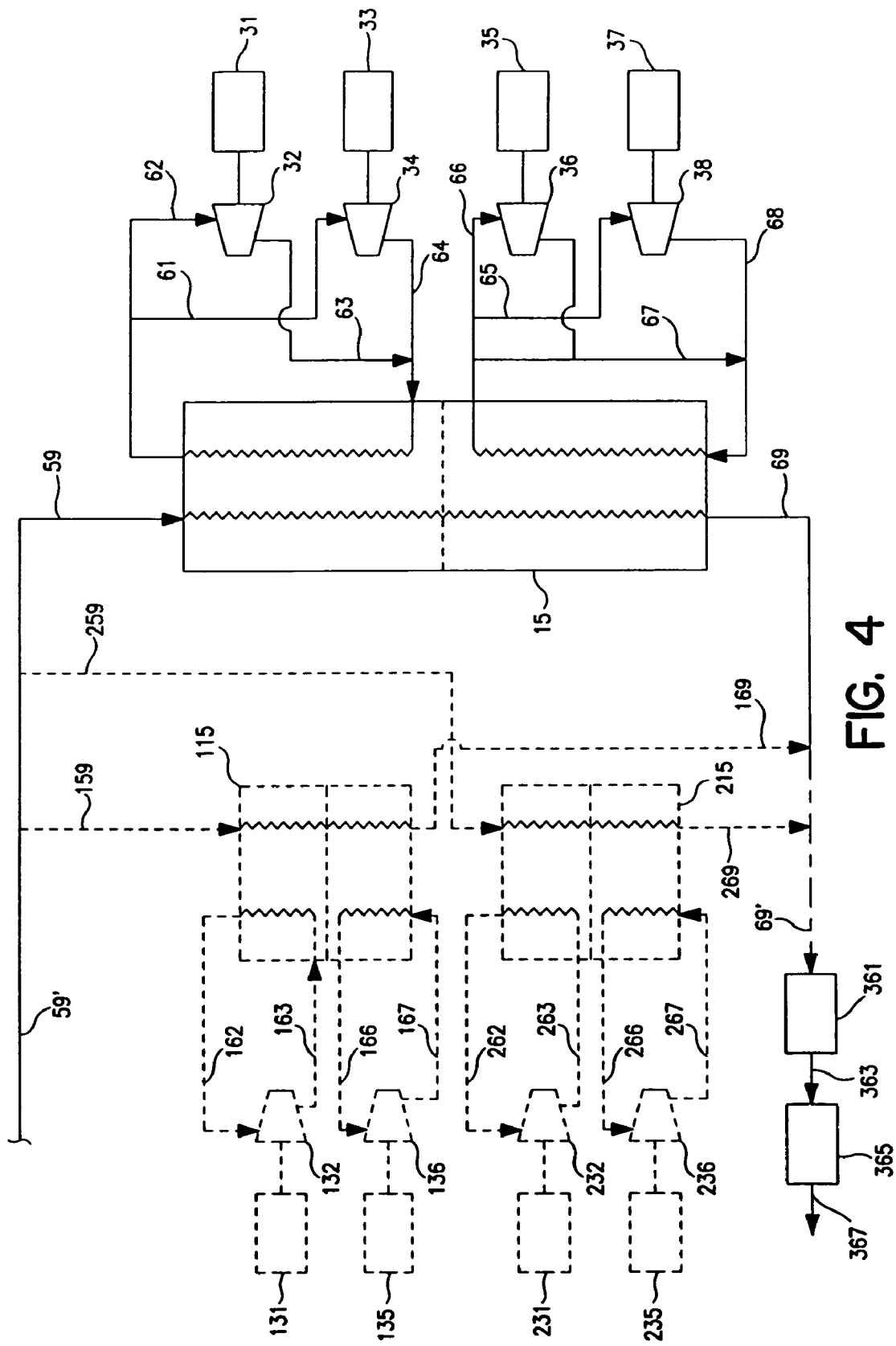
FIG. 4 is a schematic diagram of an embodiment of a liquefaction facility where a launch train comprises refrigerant compression and cryogenic heat exchange equipment and associated piping depicted with solid lines and subsequent expansion phases (modules) comprise refrigerant compression and cryogenic heat exchange equipment and associated piping depicted by the dashed lines.

In the preferred embodiment shown in FIG. 4, an arrangement of cryogenic heat exchangers and associated compressors, turbines, and piping suitable for the liquefaction of a light hydrocarbon gas has been shown where solid lines represent a launch (new or existing) train and the dotted lines represent possible expansion equipment and associated piping required for a one or two phase modular expansion. A gas stream that has been treated in the AGRU and dehydrated is received by process line 59' (fifty-nine prime) and may be distributed to cryogenic heat exchangers 15, 115, and 215 via lines 59, 159, and 259 respectfully.

As shown, compressed refrigerant is supplied to cryogenic heat exchangers 15, 115, and 215 by turbines 31, 33, 35, 37, 131, 135, 231, and 235 respectively, which are shaft coupled to refrigerant compressors 32, 34, 36, 38, 132, 136, 232, and 236 respectfully. High-pressure refrigerant is supplied to compressors 32, 34, 132, and 232 by high-pressure refrigerant lines 61, 62, 162, and 262. These lines typically return high-pressure refrigerant from cryogenic heat exchangers 15, 115, and 215 after it has served its purpose as a refrigerant and has been warmed to a substantially gaseous condition. Compressed high-pressure refrigerant is supplied to cryogenic heat exchangers 15, 115, and 215 via lines 63, 64, 163, and 263. Low-pressure refrigerant is supplied to compressors 36, 38, 136, and 236 by low-pressure refrigerant lines 65, 66, 166, and 266. These lines typically return low-pressure refrigerant from cryogenic heat exchangers 15, 115, and 215 after it has served its purpose as a refrigerant and has been warmed to substantially gaseous condition. Compressed low-pressure refrigerant is supplied to cryogenic heat exchangers 15, 115, and 215 via lines 67, 68, 167, and 267. No significance should be attributed to this except that refrigerants can be produced from compressors 32, 34, 36, 38, 132, 136, 232, and 236 at different pressures if desired and passed to cryogenic heat exchangers 15, 115, 215 at different points in the refrigeration process if desired and as appropriate. The same or different refrigerants can be used in the high-pressure and low-pressure refrigerant loops.

While not shown on FIG. 4, mercury or other contaminant removal equipment is typically employed in a light hydrocarbon liquefaction process. For mercury removal, there are two methods to accomplish the task, a non-regenerative system or a regenerative system.

In the non-regenerative system, elemental mercury in the gas phase is trapped by mercury trapping material such as sulfur, which fixes the volatile mercury in the form of non-volatile mercury sulfide (HgS). Most commonly, an activated carbon is chemically treated or impregnated with a mercury-fixing compound such as sulfur. The mercury is chemi-sorbed onto the non-regenerative carbon, which must be periodically replaced.

In the regenerative system, elemental mercury in the gas phase is trapped by mercury trapping material such as silver. The silver is supported on alumina or zeolite (mol sieve), or other inert support. This material is placed in the mol sieve unit and the mercury is desorbed during the regeneration cycle.

LNG product storage and shipping is also shown in FIG. 4 which includes a LNG product storage facility 361, which receives product from lines 69 and 69' (sixty-nine prime) as shown. LNG product is then passed from LNG product storage facility 361 via a line 363 to a LNG shipping facility 365. At LNG shipping facility 365, the product LNG is typically shipped, as shown generally by arrow 367, by sea via a docking, transfer piping and the like to a transport ship, or the product LNG may also be shipped by land pipelThe, both as generally known in the art.

According to the present invention, an improved system and method for producing natural gas for refrigeration process that has been treated by acid gas removal and dehydration comprising a launch train and multiple phased expansions has been shown. It will be readily appreciated by those skilled in the art, upon review of FIGS. 2 through 4, that savings in terms of space (real estate) and capital expenditure that can be obtained through modular expansion according to the invention.

According to the present invention improved efficiency and economy have been achieved by including in a launch train of a light hydrocarbon gas liquefaction process shared facilities which can be used by subsequent expansions by either modularization or by use of the shared facilities which are designed for the desired maximum capacity of light hydrocarbon gas to be processed in the liquefaction process initially. This results in substantial savings in the overall operation of the process at maximum capacity and provides for great ease in expanding the process incrementally. For instance in the treatment of the light hydrocarbon gas streams improved economy can be achieved as discussed by adding a regeneration section which is of a size suitable to regenerate aqueous amine for all of the acid gas removal vessels which are contemplated at maximum capacity of the process comprising all of the trains in combination. While this capacity may not be achieved for many years the added cost of the larger vessel is relatively minor compared to the savings by comparison to the use of a second regeneration vessel and a second acid gas removal vessel for each train. Similarly the use of the dehydration vessels as discussed above has resulted in substantial savings. For instance even when only two vessels are used initially the addition of a third vessel for operation in this fashion permits the addition of a second train but with the addition of only a single dehydration vessel rather than the pair of dehydration vessels usually required. Further as noted in FIGS. 2-4 in the event that less than a full liquefaction facility is required for the desired increase in capacity the added liquefaction facility can be added with a reduced light hydrocarbon gas flow with a reduced quantity of compressed refrigerant to produce a liquefied light hydrocarbon gas stream in a quantity suitable to meet the current demand. Similarly docking facilities, access roads, $C_3+$ hydrocarbon removal facilities and the like can all be designed for either modular expansion or of a size to accommodate the maximum plant size initially with the resulting efficiency in process expansion when required and economies achieved by reducing the duplication of equipment.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

We claim:

1. A light hydrocarbon gas liquefaction process for the liquefaction of selected quantities of light hydrocarbon gas, said process including a light hydrocarbon gas liquefaction launch train to liquefy an initial amount of light hydrocarbon gas and one or more optional subsequent expansion phases to said light hydrocarbon gas liquefaction launch train to liquefy additional selected quantities of light hydrocarbon gas up to a selected maximum quantity of light hydrocarbon gas for the process, the process comprising:

a) constructing the light hydrocarbon gas liquefaction launch train for the liquefaction of the initial amount of light hydrocarbon gas, the launch train including facilities for light hydrocarbon gas pretreatment to remove at least one of acid gases, mercury, and water; facilities for refrigerant compression; facilities for cryogenic heat exchange; access services; facilities for light hydrocarbon gas liquefaction; facilities for liquefied light hydrocarbon gas product storage and shipping; and $C^{3+}$ hydrocarbon removal facilities;

b) positioning at least a portion of the facilities in the launch train for shared use by the launch train and one or more subsequent optional modular expansion phases for liquefaction of up to the selected maximum quantity of light hydrocarbon gas;

c) constructing at least a portion of the launch train facilities for shared use by modular expansion, as required by the addition of one or more subsequent optional expansion phases to the launch train, up to a maximum capacity as required to liquefy the selected maximum quantity of light hydrocarbon gas, the shared use facilities of the launch train being designed at a size sufficient to liquefy the selected maximum quantity of light hydrocarbon gas in the launch train as constructed and expanded in the one or more optional expansion phases to the required capacity; and d) processing light hydrocarbon gas in the launch train to produce liquefied light hydrocarbon gas.

2. The process of claim 1 further comprising the following steps:

e) constructing one or more expansion phases to the launch train to increase the capacity of the launch train as required to liquefy additional selected quantities of light hydrocarbon gas up to the selected maximum quantity of light hydrocarbon gas for the process, said expansion phases being capable of producing liquefied light hydrocarbon gas by use of the shared use facilities in the launch train as constructed and expanded in the one or more expansion phases up to the required capacity; and f) processing light hydrocarbon gas into liquefied light hydrocarbon gas using the launch train and the one or more expansion phases employing the shared use facilities.

3. The process of claim 1 wherein the shared use facilities include acid gas removal equipment.

4. The process of claim 1 wherein the shared use facilities include mercury removal equipment.

5. The process of claim 1 wherein the shared use facilities include dehydration equipment.

6. The process of claim 1 wherein the shared use facilities include refrigerant compression equipment and cryogenic heat exchange equipment.

7. A light hydrocarbon gas liquefaction process for the liquefaction of selected quantities of light hydrocarbon gas, said process including a light hydrocarbon gas liquefaction launch train to liquefy an initial amount of light hydrocarbon gas and one or more subsequent expansion phases to said hydrocarbon gas liquefaction launch train to liquefy additional selected quantities of light hydrocarbon gas up to a selected maximum quantity of light hydrocarbon gas for the process, the process comprising:

a) constructing the light hydrocarbon gas liquefaction launch train for the liquefaction of the initial amount of light hydrocarbon gas, the launch train including facilities for light hydrocarbon gas pretreatment to remove at least one of acid gases, mercury, and water; facilities for refrigerant compression; facilities for cryogenic heat exchange; access services; facilities for light hydrocarbon gas liquefaction; facilities for liquefied light hydrocarbon gas product storage and shipping; and $C^{3+}$ hydrocarbon removal facilities;

b) positioning and sizing at least a portion of the facilities in the launch train for shared use by the launch train and subsequent modular expansion phases;

c) constructing at least a portion of the launch train facilities for shared use by modular expansion, as required by the addition of one or more subsequent expansion phases to the launch train, up to a maximum capacity as required to liquefy the selected maximum quantity of light hydrocarbon gas, the shared use facilities of the launch train being designed at a size sufficient to liquefy the selected maximum quantity of light hydrocarbon gas in the launch train as constructed and expanded in the one or more expansion phases to required capacity;

d) processing light hydrocarbon gas in the launch train to produce liquefied light hydrocarbon gas;

e) constructing one or more expansion phases to the launch train to increase the capacity of the launch train as required to liquefy additional selected quantities of light hydrocarbon gas up to the selected maximum quantity of light hydrocarbon gas for the process, said expansion phases being capable of producing liquefied light hydrocarbon gas by use of the shared use facilities in the launch train as constructed and expanded in the one or more expansion phases up to the required capacity; and f) processing light hydrocarbon gas into liquefied light hydrocarbon gas using the launch train and the one or more expansion phases employing the shared use facilities.

8. The process of claim 7 wherein the shared use facilities include acid gas removal facilities.

9. The process of claim 7 wherein the shared use facilities include mercury removal facilities.

10. The process of claim 7 wherein the shared use facilities include dehydration facilities.

11. The process of claim 7 wherein the shared use facilities include refrigerant compression equipment and cryogenic liquefaction facilities.

12. A method for designing an efficient and economical light hydrocarbon gas liquefaction process for the liquefaction of selected quantities of light hydrocarbon gas in an initial light hydrocarbon gas liquefaction launch train and one or more optional subsequent expansion phases to said light hydrocarbon gas liquefaction launch train to liquefy additional selected quantities of light hydrocarbon gas up to a selected maximum quantity of light hydrocarbon gas for the process, the method comprising:

a) designing the light hydrocarbon gas liquefaction launch train for the liquefaction of the selected initial quantity of light hydrocarbon gas, the launch train including facilities for light hydrocarbon gas pretreatment to remove at least one of acid gases, mercury, and water; facilities for refrigerant compression; facilities for cryogenic heat exchange; access services; facilities for light hydrocarbon gas liquefaction; facilities for liquefied light hydrocarbon gas product storage and shipping; and $C^{3+}$ hydrocarbon removal facilities;

b) designing and sizing at least a portion of the facilities in the launch train for shared use by the launch train and any subsequent optional modular expansion phases to said launch train; and, c) designing and sizing at least a portion of the launch train facilities for shared use by modular expansion, as required by the addition of one or more subsequent optional expansion phases to the launch train, up to a maximum capacity as required to liquefy the selected maximum quantity of light hydrocarbon gas for the process, the shared use facilities of the launch train being designed at a size sufficient to liquefy the selected maximum quantity of light hydrocarbon gas for the process in the launch train as constructed and expanded in the one or more optional expansion phases up to the required capacity.

13. The method of claim 12 further comprising the following steps:

d) designing one or more expansion phases to the launch train to increase the capacity of the launch train as required to liquefy additional selected quantities of light hydrocarbon gas up to the selected maximum quantity of light hydrocarbon gas for the process, said expansion phases capable of producing liquefied light hydrocarbon gas by use of the shared use facilities in the launch train as constructed and expanded in the one or more expansion phases to the required capacity.

14. The method of claim 12 wherein the shared use facilities include acid gas removal equipment.

15. The method of claim 12 wherein the shared use facilities include mercury removal equipment.

16. The method of claim 12 wherein the shared use facilities include dehydration equipment.

17. The method of claim 12 wherein the shared use facilities include refrigerant compression equipment and cryogenic heat exchange equipment.

18. A method for efficiently and economically constructing a light hydrocarbon gas liquefaction process for the liquefaction of selected quantities up to a selected maximum quantity of light hydrocarbon gas in an initial light hydrocarbon gas liquefaction launch train and one or more optional subsequent expansion phases to said initial light hydrocarbon gas liquefaction launch train to liquefy additional selected quantities of light hydrocarbon gas up to the selected maximum quantity of light hydrocarbon gas for the process, the method comprising:

a) constructing a light hydrocarbon gas liquefaction launch train for the liquefaction of a selected initial quantity of light hydrocarbon gas including facilities for light hydrocarbon gas pretreatment to remove at least one of acid gases, mercury and water; facilities for refrigerant compression; facilities for cryogenic heat exchange; access services; facilities for light hydrocarbon gas liquefaction; facilities for liquefied light hydrocarbon gas product storage and shipping; and $C^{3+}$ hydrocarbon removal facilities:

b) positioning at least a portion of the facilities in the launch train for shared use by the launch train and optional subsequent expansion phases;

c) constructing and sizing at least a portion of the launch train facilities for shared use for modular expansion as required by the addition of subsequent expansion phases up to the maximum capacity of the light hydrocarbon gas for the process in the launch train as constructed and expanded in the one or more optional expansion phases to the required capacity.

19. The method of claim 18 further comprising the following steps:

d) constructing one or more expansion phases to the launch train to increase the capacity of the launch train as required to liquefy additional selected quantities of light hydrocarbon gas up to the selected maximum quantity of light hydrocarbon gas for the process, said expansion phases being capable of producing liquefied light hydrocarbon gas by use of the shared use facilities in the launch train as constructed and expanded in the one or more expansion phases up to the required capacity.

20. The method of claim 18 wherein the shared use facilities include acid gas removal equipment.

21. The method of claim 18 wherein the shared use facilities include mercury removal equipment.

22. The method of claim 18 wherein the shared use facilities include dehydration equipment.

23. The method of claim 18 wherein the shared use facilities include refrigerant compression equipment and cryogenic heat exchange equipment.

24. The method of claim 18 wherein the shared use facilities include $C^{3+}$ hydrocarbon removal facilities.

25. The process of claim 1 wherein the shared use facilities include $C^{3+}$ hydrocarbon removal facilities.

26. The process of claim 7 wherein the shared use facilities include $C^{3+}$ hydrocarbon removal facilities.

27. The method of claim 12 wherein the shared use facilities include $C^{3+}$ hydrocarbon removal facilities.

* * * * *